(12) United States Patent
Yemini (10) Patent No.: US 6,193,265 B1
(45) Date of Patent: Feb. 27, 2001

(54) WHEELBARROW

(75) Inventor: Zvi Yemini, Tel Aviv (IL)

(73) Assignee: Zag Industries Ltd., Rosh Ha'Ayin (IL)

( * ) Notice: Subject to any disclaimer, the term of this patent is extended or adjusted under 35 U.S.C. 154(b) by 0 days.

(21) Appl. No.: 09/017,193

(22) Filed: Feb. 2, 1998

Related U.S. Application Data (63) Continuation-in-part of application No. 08/781,018, filed on Jan. 9, 1997, now Pat. No. 5,884,982.

(51) Int. Cl.$^7$ ............................................. B62B 1/18
(52) U.S. Cl. ........................................ 280/653; 280/47.31
(58) Field of Search ..................... 280/33.994, 33.998, 280/659, 655.1, 653, 47.31, 47.33, 47.371, 47.26, 47.34, 35, 656, 79.11, 47.18; 206/509, 505, 504, 503; 301/111, 112, 119, 121, 122; 16/45, 30, 33, 38; D34/12–27

(56) References Cited

U.S. PATENT DOCUMENTS

| | | | |
|---|---|---|---|
| D. 327,350 | * 6/1992 | Brown et al. | D34/16 |
| D. 337,409 | * 7/1993 | Maple et al. | D34/27 |
| D. 370,326 | * 5/1996 | Chapmane et al. | D34/16 |
| D. 389,972 | * 1/1998 | Grosfillex | D34/16 |
| D. 393,129 | * 3/1998 | Yemini | D34/16 |
| D. 404,870 | * 1/1999 | Van Rhienen | D34/16 |
| 1,560,164 | * 11/1925 | Jarnagin | 280/651 |
| 3,740,100 | * 6/1973 | Perego | 301/121 |
| 3,822,437 | * 7/1974 | Screen | 16/45 |
| 3,913,946 | * 10/1975 | Valentine et al. | 280/236 |
| 4,234,203 | 11/1980 | Johnson | 280/32.5 |
| 4,530,543 | * 7/1985 | Keane | 301/63 PW |
| 5,318,315 | * 6/1994 | White et al. | 280/47.26 |
| 5,358,314 | * 10/1994 | Spadotto | 301/111 |
| 5,415,421 | * 5/1995 | Godwin | 280/47.31 |
| 5,598,605 | * 2/1997 | Tomasiak | 16/45 |
| 5,603,555 | * 2/1997 | Dickey et al. | 301/111 |
| 5,615,903 | 4/1997 | Spear et al. | 280/47.19 |
| 5,687,979 | * 11/1997 | Plevka | 280/47.19 |
| 5,692,761 | * 12/1997 | Havlovitz | 280/33.994 |
| 5,845,916 | * 12/1998 | Stroud | 280/47.38 |
| 5,884,982 | * 3/1999 | Yemini | 301/111 |

FOREIGN PATENT DOCUMENTS 2 292 713   9/1994   (GB).

* cited by examiner

Primary Examiner—Brian L. Johnson
Assistant Examiner—Bridget Avery
(74) Attorney, Agent, or Firm—Pillsbury Winthrop LLP (57) ABSTRACT

A wheelbarrow includes a container, a pair of handles rigidly connected to the container, and a support system including at least one wheel assembly for supporting the container. The container has a longitudinal-vertical plane of symmetry. Each of the handles extends in an extensional direction angled rearwardly outwards such that, in a horizontal projection, the extensional direction forms an angle of between about 65° and about 85° with the plane of symmetry.

9 Claims, 13 Drawing Sheets

WHEELBARROW

This application is a continuation-in-part of application Ser. No. 08/781,018 filed Jan. 9, 1997 now U.S. Pat. No. 5,884,982.

FIELD AND BACKGROUND OF THE INVENTION

The present invention relates to wheelbarrows, and in particular, to readily maneuverable wheelbarrows with ergonomic handle designs and requiring small leverage to lift a load.

Wheelbarrows are well known as a tool for moving heavy loads for a short distance. Typically, a wheelbarrow has a container made from sheet metal supported by a forward wheel and two rear legs. The handles are typically formed as a pair of parallel pipes extending to the rear of the container.

The conventional wheelbarrow handle design suffers from a number of disadvantages. Although the conventional handle design is relatively comfortable to lift, the forward directed force required to move the wheelbarrow must be directed along the length of the handles. This applies transverse stress on the wrists of the user, rapidly leading to tiredness and aching joints. The conventional wheelbarrow handle design is also inconvenient for tipping-up the wheelbarrow, typically requiring at least one change of hand position during the lifting action.

Various other features of the conventional wheelbarrow design also have drawbacks. The single, forwardly-placed wheel makes the wheelbarrow unstable when the rear legs are raised. This instability is further aggravated by the positioning of the center of gravity of the container well above the wheel. Finally, the forward positioning of the wheel relative to the center of gravity leaves a large proportion of the loaded weight to be supported at the handles by the user.

Some of the aforementioned shortcomings have been addressed by a number of two-wheel wheelbarrows designs, typically made form molded plastic. An example of such a wheelbarrow is described in U.S. Pat. No. 5,615,903. Clearly, such a design is considerably more stable than a single-wheeled design. However, the high center of gravity, forwardly placed wheels, and poor handle design still present considerable disadvantages. Linkage between the two wheels may also make it difficult to steer the wheelbarrow in tight turns.

There is therefore a need for a wheelbarrow which has ergonomic handle design, and which is stable and easy to lift and maneuver.

SUMMARY OF THE INVENTION

The present invention is a readily maneuverable wheelbarrow with ergonomic handle designs and requiring small leverage to lift a load.

According to the teachings of the present invention there is provided, a wheelbarrow comprising a container, a pair of handles rigidly connected to the container, and a support system for supporting the container, the support system including at least one wheel assembly, wherein the container has a longitudinal-vertical plane of symmetry, each of the handles having an extensional direction angled rearwardly outwards such that, in a horizontal projection, the extensional direction forms an angle of between about 65° and about 85° with the plane of symmetry.

According to a further feature of the present invention, the container is divided by an intermediate wall into a front container and a rear container, the rear container being smaller than the front container.

According to a further feature of the present invention, the rear container has a rear wall, the handles being integrally formed with the rear wall.

According to a further feature of the present invention, the front container has side walls, the side walls having a plurality of shaped recesses, the wheelbarrow further comprising a plurality of clips configured to be received within the shaped recesses.

According to a further feature of the present invention, the shaped recesses have features configured to abut edges of the clips so as to prevent the clips from swiveling.

According to a further feature of the present invention, the at least one wheel assembly includes: (a) a support region integrally formed with the container, the support region having a transverse hole; (b) an axle passing through the transverse hole; (c) a wheel having a central bore; and (d) a sleeve element for positioning within the central bore, the sleeve element having: (i) an axial recess extending along a major part of the length of the sleeve element, the recess being shaped to receive the axle, (ii) an end wall for defining an extent of full insertion of the axle within the axial recess, and (iii) a substantially cylindrical external surface for rotatably engaging within the bore.

According to a further feature of the present invention, the sleeve element also has: (a) an outwardly extending radial flange for abutting an external surface of the wheel; (b) a first resilient catch for abutting an internal surface of the wheel; and (c) a second resilient catch for engaging an edge of the transverse hole.

According to a further feature of the present invention, the sleeve element also has a shoulder for abutting a surface of the support region adjacent to the transverse hole so as to space the wheel from the support region.

BRIEF DESCRIPTION OF THE DRAWINGS

The invention described here is by way of example only, with references to the accompanying drawings, wherein.

DESCRIPTION OF THE PREFERRED EMBODIMENTS

The present invention is a readily maneuverable wheelbarrows with ergonomic handle designs and requiring small leverage to lift a load.

The principles and operation of wheelbarrows according to the present invention may be better understood with reference to the drawings and the accompanying description.

Referring now to the drawings, FIGS. 1–6 show a wheelbarrow, generally designated 10, constructed and operative according to the teachings of the present invention. Generally speaking, wheelbarrow 10 has a container 12, a pair of handles 14 rigidly connected thereto, and a support system including at least one wheel assembly 16 for supporting the container. Container 12 has a longitudinal-vertical plane of symmetry 18. Each handle 14 extends in a direction 20 angled rearwardly outwards such that, in a horizontal projection, direction 20 forms an angle 22 of between about 65° and about 85°, and preferably between about 65° and about 75°, with plane of symmetry 18.

Figure 7:
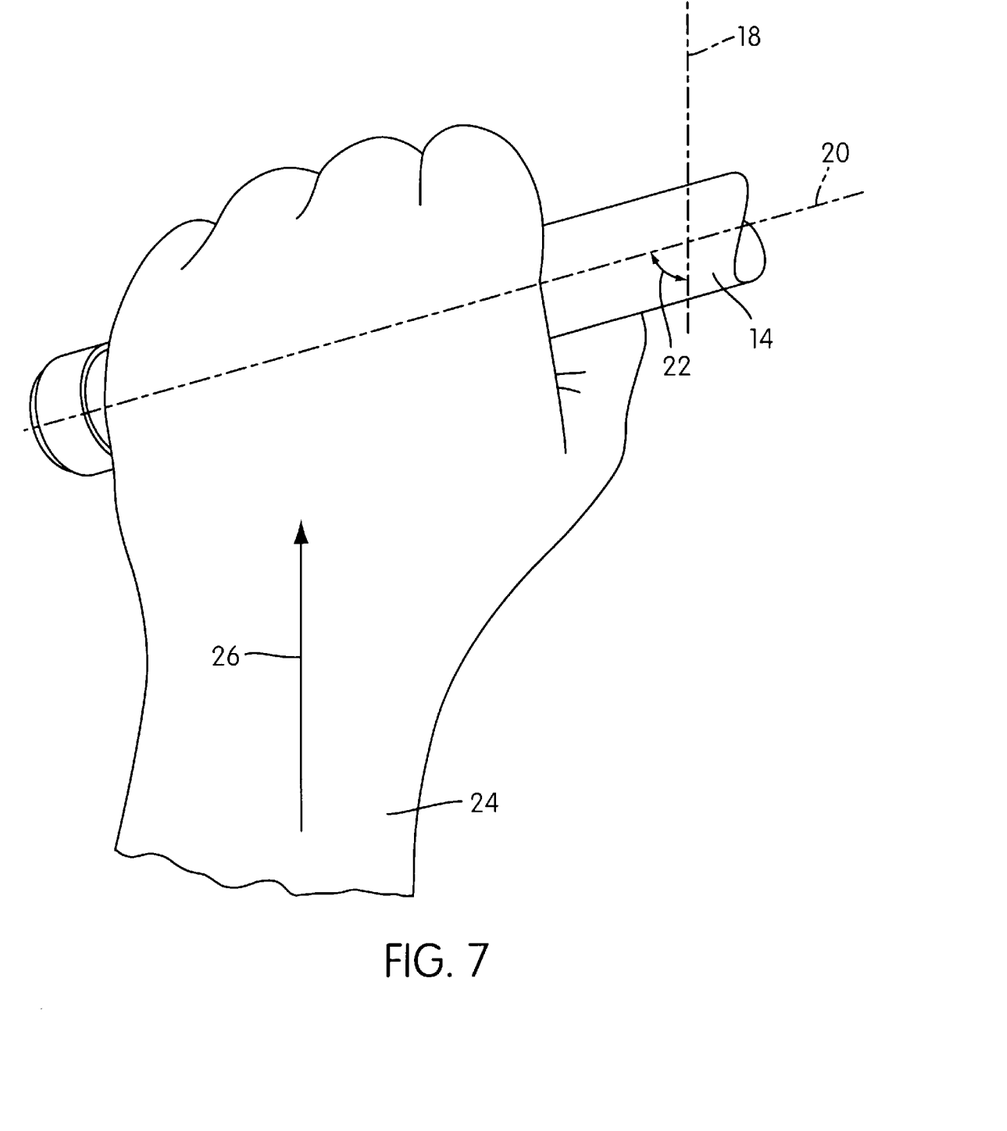
FIG. 7 shows a human left hand holding a handle of the wheelbarrow.
Figure 8:
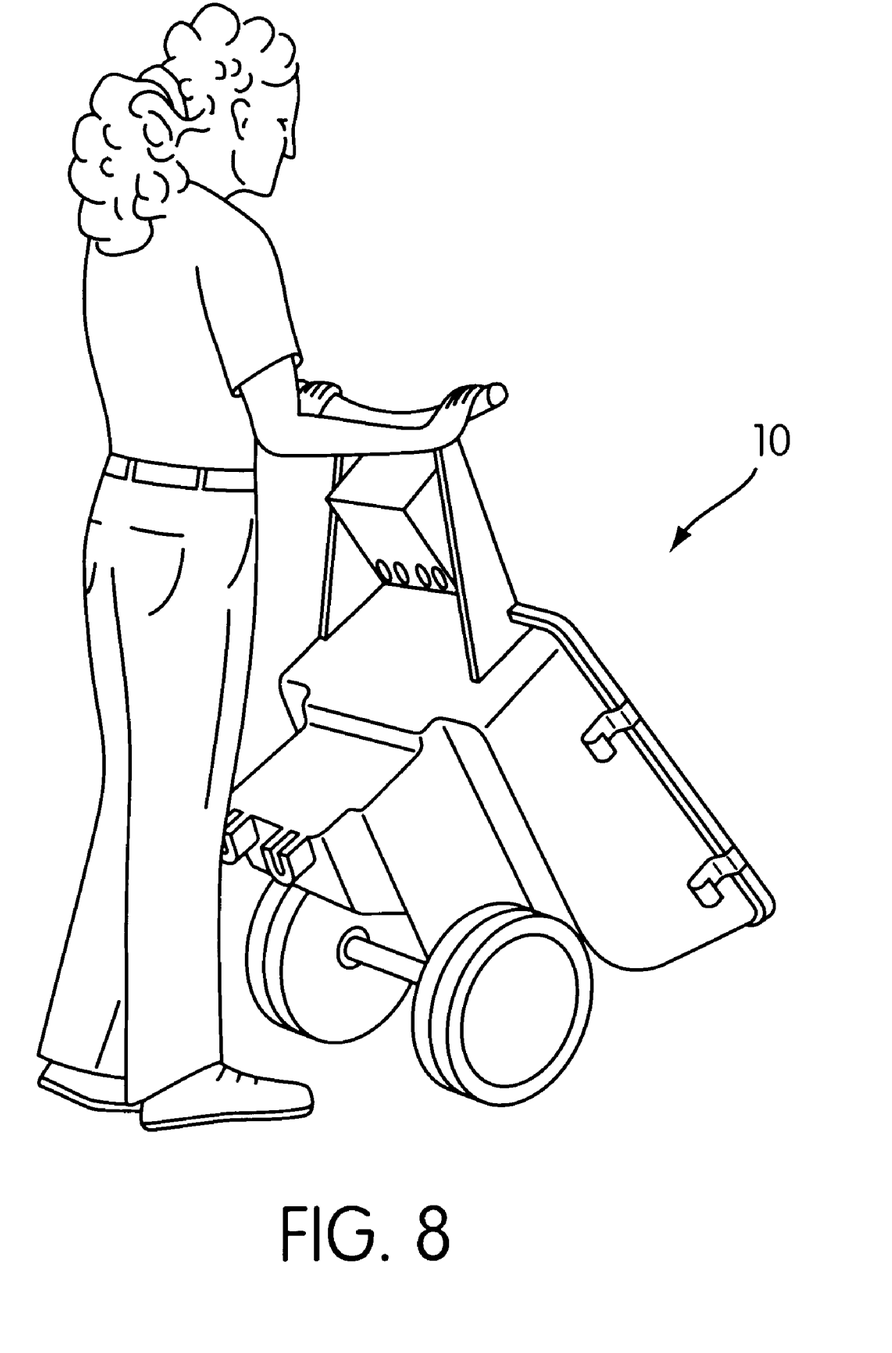
FIG. 8 shows a woman emptying the wheelbarrow.

It will be readily apparent that the selection of extensional direction 20 as described offers a considerable improvement in comfort and functionality over conventional wheelbarrow handle designs. Specifically, with reference to FIG. 7, it will be noted that the wrist position of a human hand 24 grasping handle 14 is very close to the natural straight resting position of the wrist. Furthermore, the direction of a force 26 required to push wheelbarrow 10 forward is directed mainly along the forearm through the wrist to the palm of the hand, thereby minimizing arm strain. Additionally, the described handle configuration greatly facilitates tipping of the wheelbarrow as illustrated in FIG. 8. Unlike the conventional parallel-bar type handles, no change of grip is normally required while raising the wheelbarrow from its rest position to a tipped state.

Turning now to the features of wheelbarrow 10 in more detail, container 12 is preferably divided by an intermediate wall 28 into a main front container 30 and a smaller rear container 32. In this case, handles 14 are advantageously integrally formed with the rear wall 34 of rear container 32. Rear container 32 is typically a shallow container with a base no more than about 30 cm below the level of handles 14. Such a container is very useful for temporary storage of tools and the like so that they can be readily accessed without bending down to reach the base level of main container 30.

Figure 1:
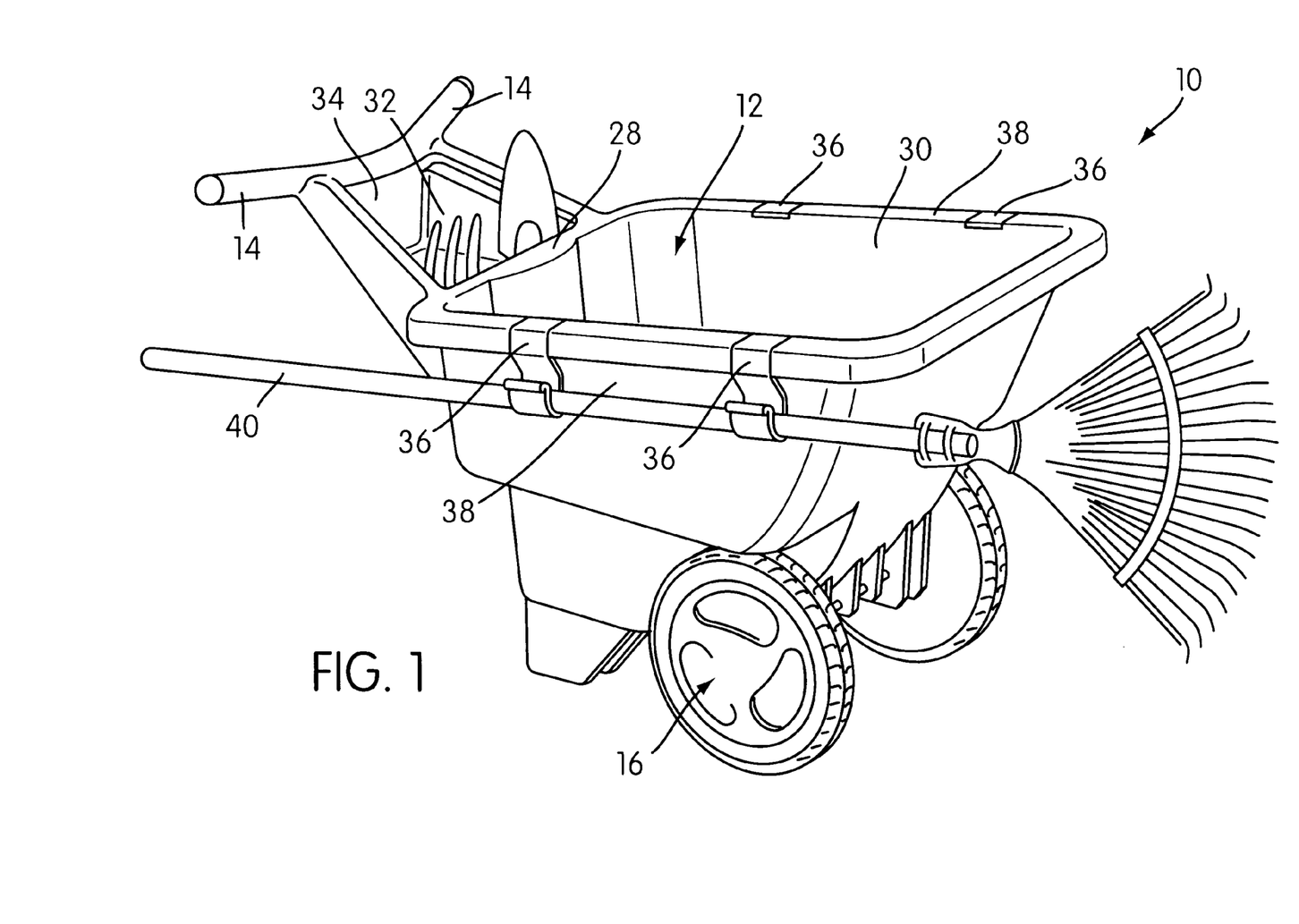
FIG. 1 is a perspective view of the wheelbarrow.
Figure 2:
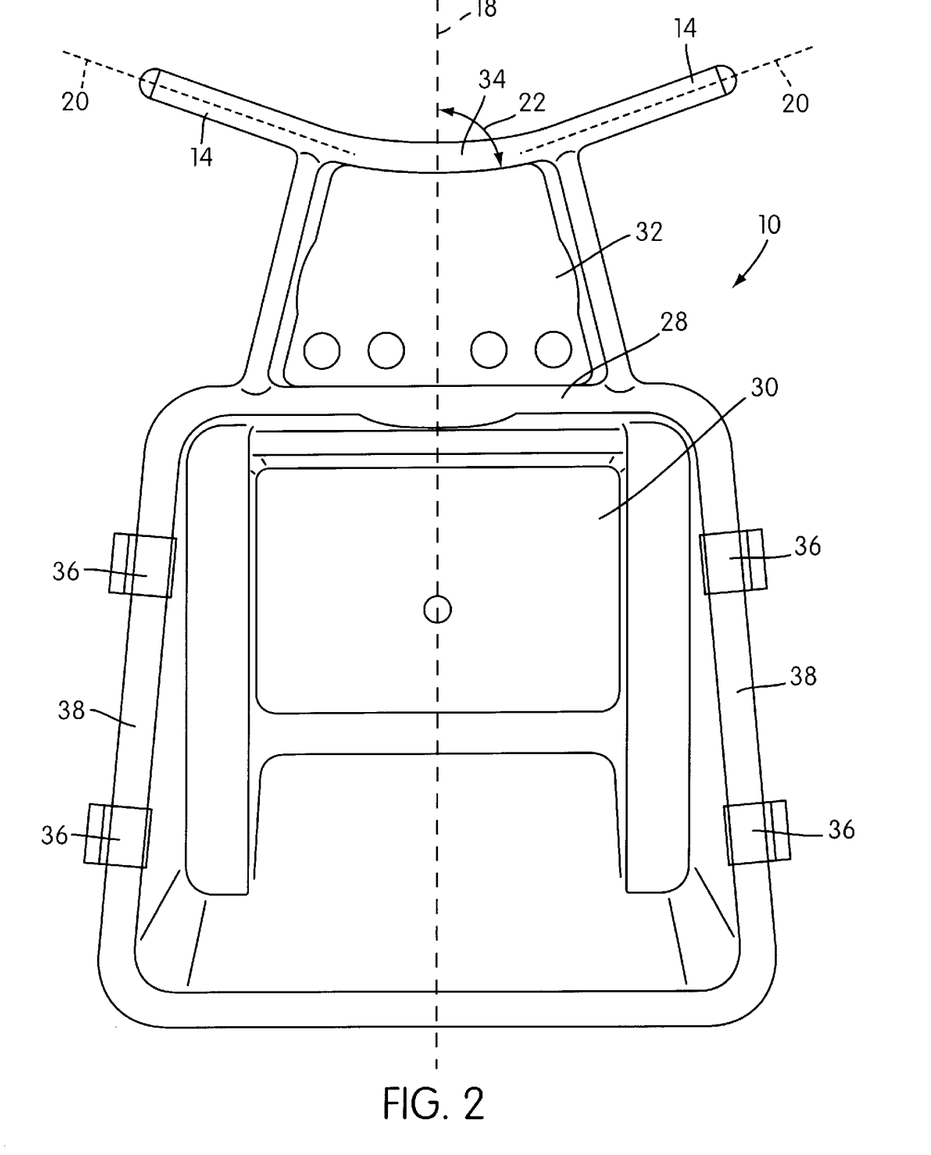
FIG. 2 is a top view of the wheelbarrow.
Figure 3:
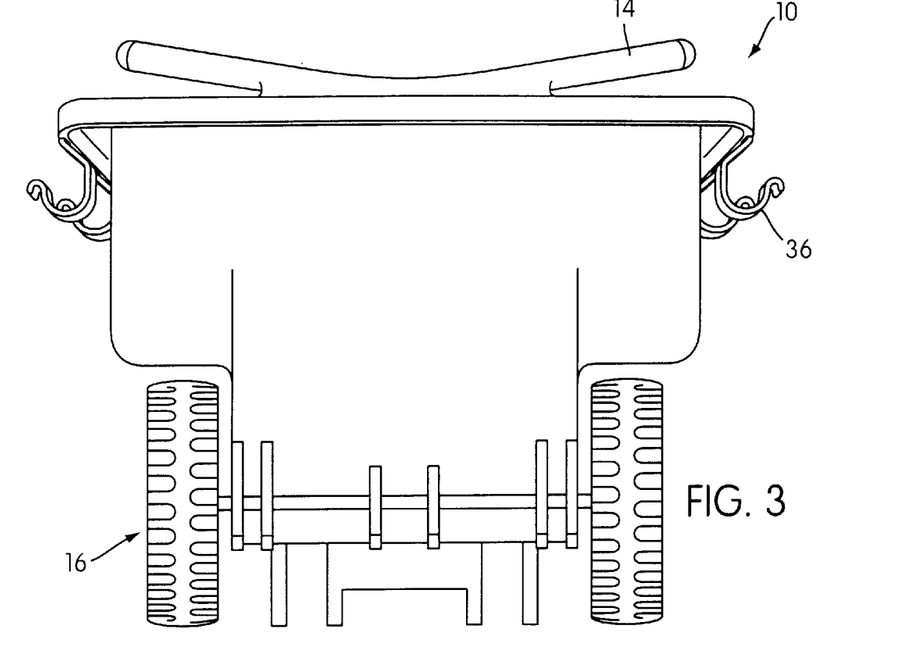
FIG. 3 is a front view of the wheelbarrow.
Figure 4:
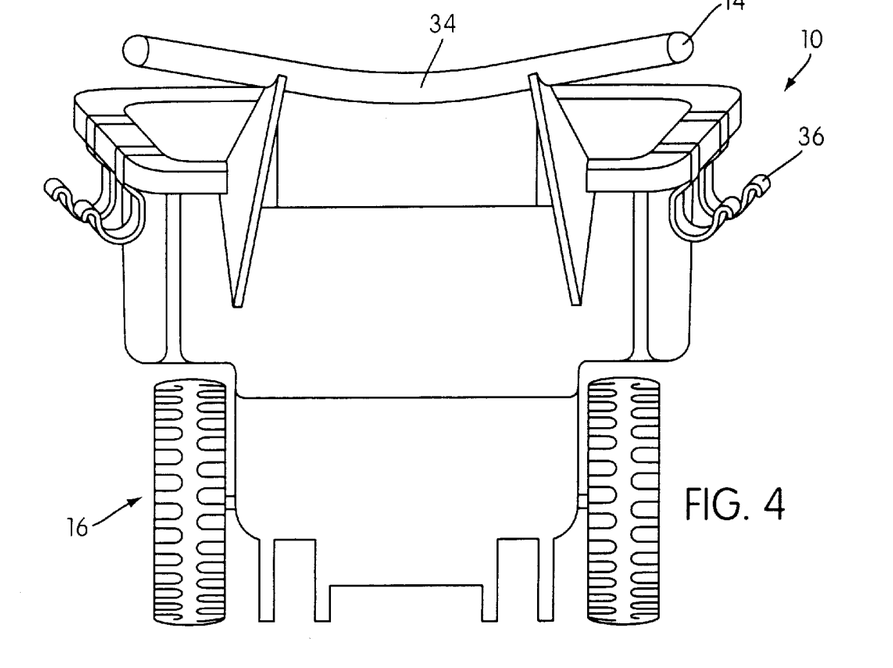
FIG. 4 is a rear view of the wheelbarrow.
Figure 5:
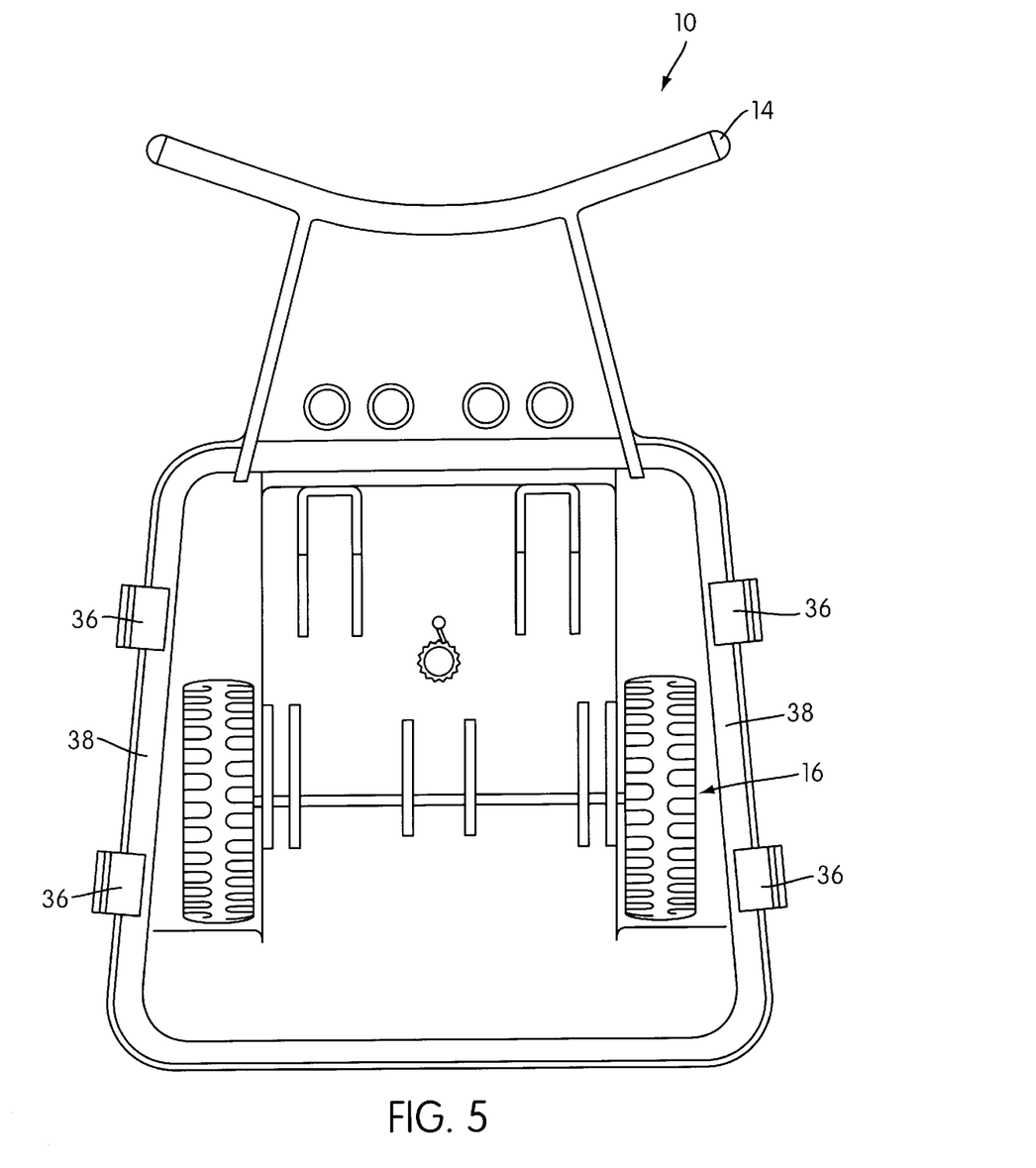
FIG. 5 is a bottom view of the wheelbarrow.
Figure 6:
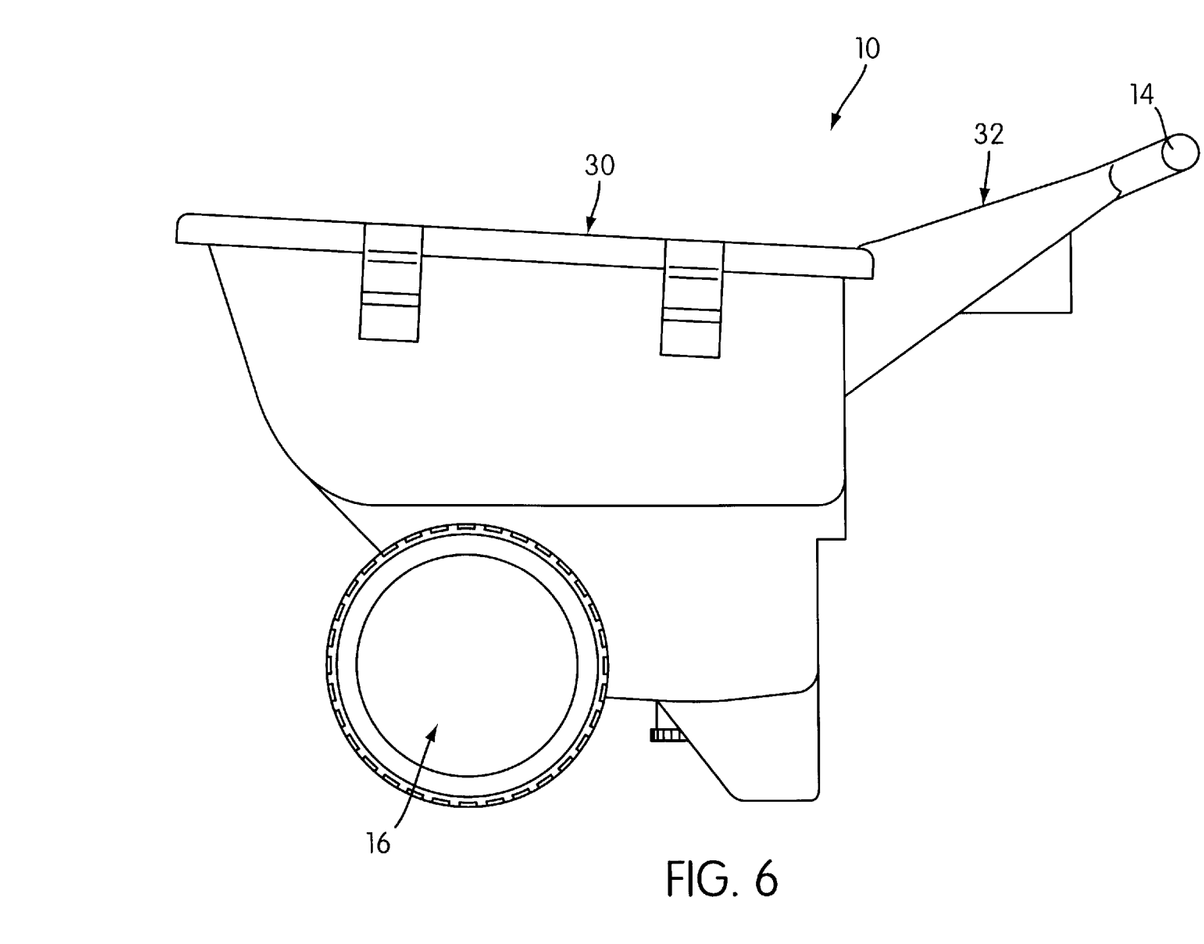
FIG. 6 is a side view of the wheelbarrow.
Figure 9:
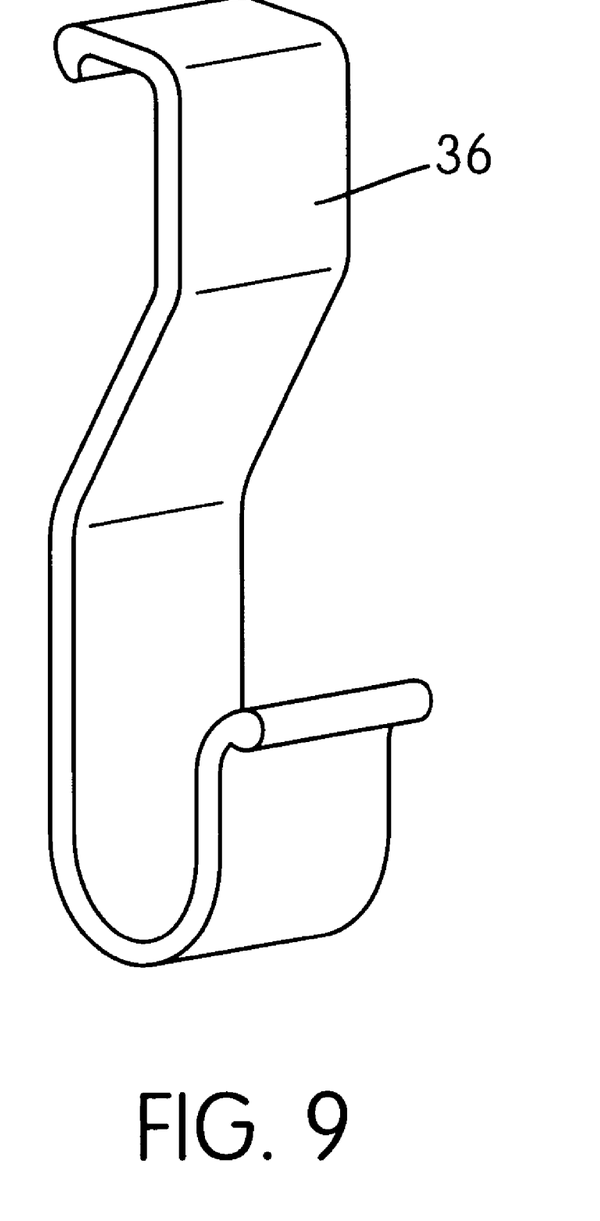
FIG. 9 is a perspective view of a clip for use with the wheelbarrow of FIGS. 1–6.
Figure 10:
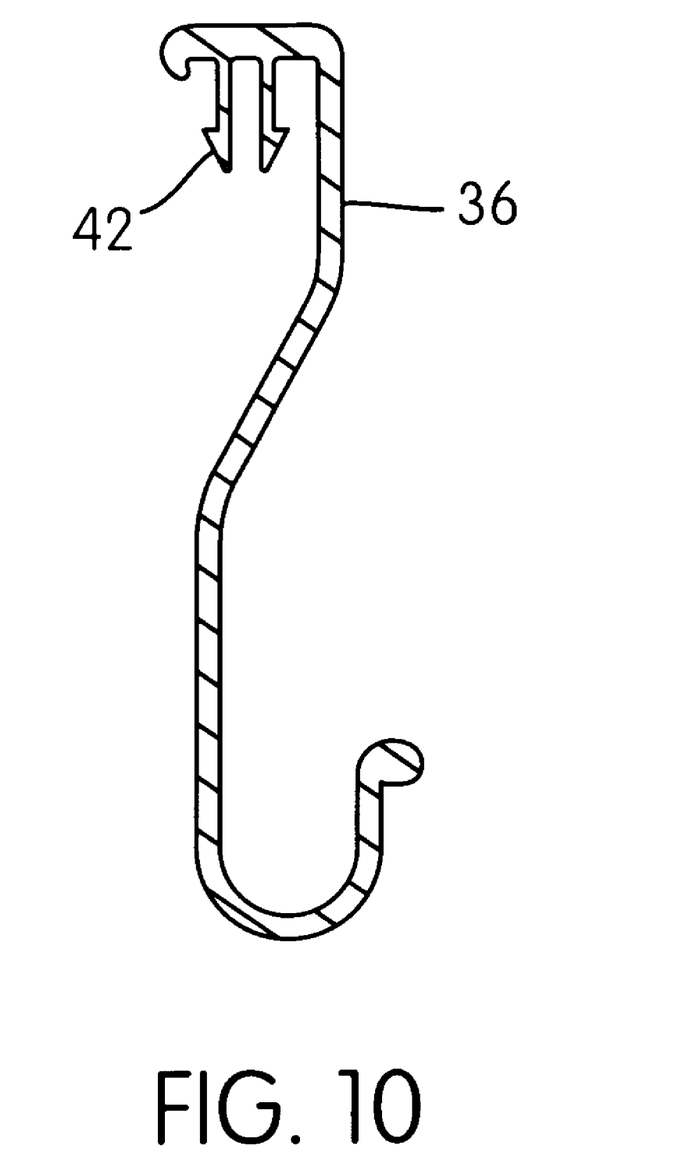
FIG. 10 is a section view of the clip of FIG. 9.

An additional preferred feature of wheelbarrow 10 is the provision of a number of clips 36, deployed along the side walls 38 of main container 30, for holding a long-handled gardening tool 40 or the like as shown in FIG. 1. A preferred form for clips 36 is shown in FIGS. 9 and 10. Clips 36 preferably have a snap-in design configured to engage a number of shaped recesses in side walls 38. In the implementation illustrated here, the shaped recesses are formed as recessed parallel-sided channels having sides configured to abut parallel edges of clips 36 so as to prevent the clips from swiveling. Typically, the depth of the recesses is substantially equal to the thickness of the clip so that, when assembled, the clip surface lies roughly flush with the rim of the container. Clip 36 is preferably provided with a barbed pin 42 which engages a corresponding hole in the upper edge of side wall 38.

By providing at least two clips 36 spaced along side wall 38, a long-handled tool can be retained in a stable manner for convenient transportation and easy access when needed.

Turning now to FIGS. 11–14, these show a sleeve element, generally designated 110, for use in wheel assembly 16. Generally speaking, sleeve element 110 features an axial recess 112 extending along a major part of its length and terminating in an end wall 114. A first part 116 of the external surface of sleeve element 110 provides a substantially cylindrical surface. External surface 116 is delineated at one end by an outwardly extending radial flange 118. Towards the other end, sleeve element 110 features a number of resilient catch elements 120. Beyond catch elements 120, the external surface of sleeve element 110 features an inward step which forms a shoulder 122 followed by a secondary substantially cylindrical external surface 124 provided with a number of secondary catch elements 126.

Figure 11:
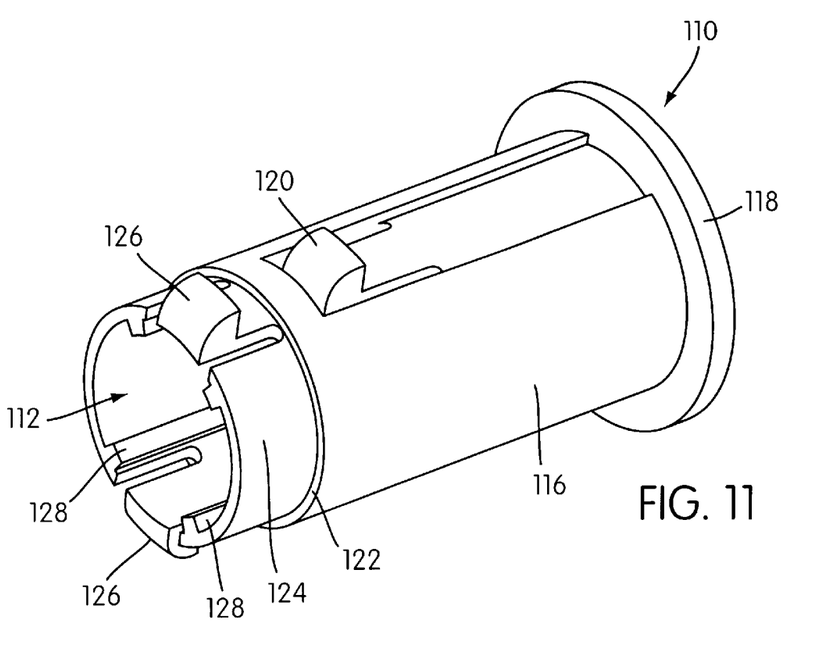
FIG. 11 is a first perspective view of a sleeve element of a wheel assembly for use in the wheelbarrow of FIGS. 1–6.
Figure 12:
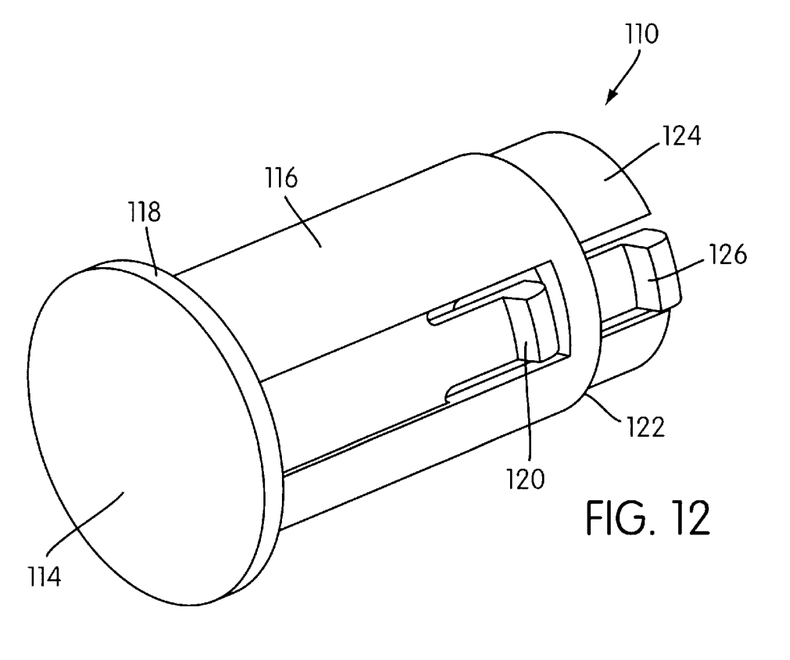
FIG. 12 is a second perspective view of the sleeve element of FIG. 11.
Figure 13:
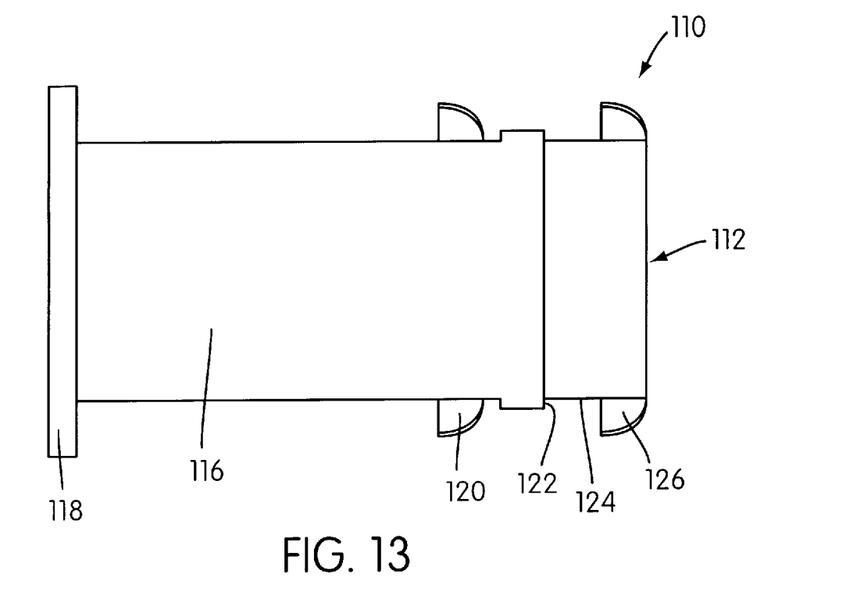
FIG. 13 is a side view of the sleeve element of FIG. 11.

Preferably, sleeve element 110 is formed from a polymer material with a low coefficient of friction. Examples of suitable materials include, but are not limited to, nylon and acetal resins. Alternatively, various metals or metal alloys may be used.

Figure 14:
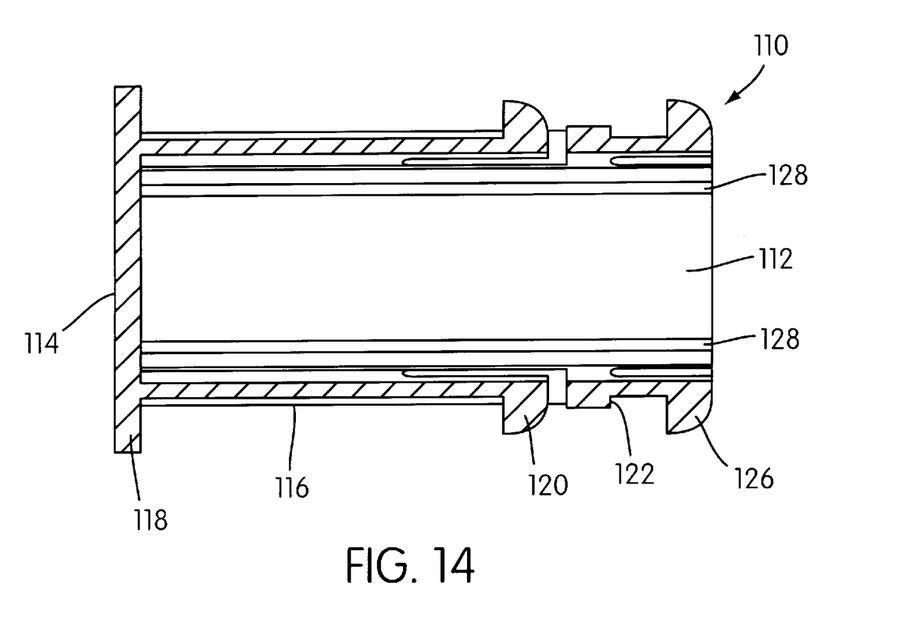
FIG. 14 is a side cross-sectional view through the sleeve element of FIG. 11.

Turning now to the features of sleeve element 110 in more detail, axial recess 112 is designed to receive an axle fully inserted until the end of the axle abuts end wall 114. Although described here as a "wall", end wall 114 is not necessarily a continuous flat surface. In fact, any transverse projection which defines a fully inserted position of an axle within axial recess 112 may be used. Preferably, the inner surface of axial recess 112 has features such as longitudinal ribs 128 for locking sleeve element 110 in contact with the axle.

External surface 116 is the primary mounting surface for the central bore of a wheel. The wheel is prevented from slipping off sleeve element 110 by flange 118 which abuts the outer side of the wheel, i.e., the side of the wheel facing away from the wheelbarrow body. On the inner side of the wheel, i.e., the side facing the wheelbarrow body, resilient catch elements 120 lodge against an inner surface of the wheel to prevent it from slipping inwards.

Resilient catch elements 120 and 126 are preferably formed as radially projecting tabs at the ends of flexible tongues (see FIGS. 11 and 14). The projecting tabs are preferably rounded or wedge-shaped on their front faces, i.e. the leading surfaces in their direction of insertion, to facilitate assembly. Their rear faces, i.e., the surfaces which lock against the wheel or the wheelbarrow body, are typically flat.

Typically, resilient catch elements 120 and 126 are formed as an integral part of sleeve element 110. The flexibility is provided by radial thinning of the tongue portion, taking advantage of the intrinsic resilience of the material from which sleeve element 110 is produced.

Figure 15:
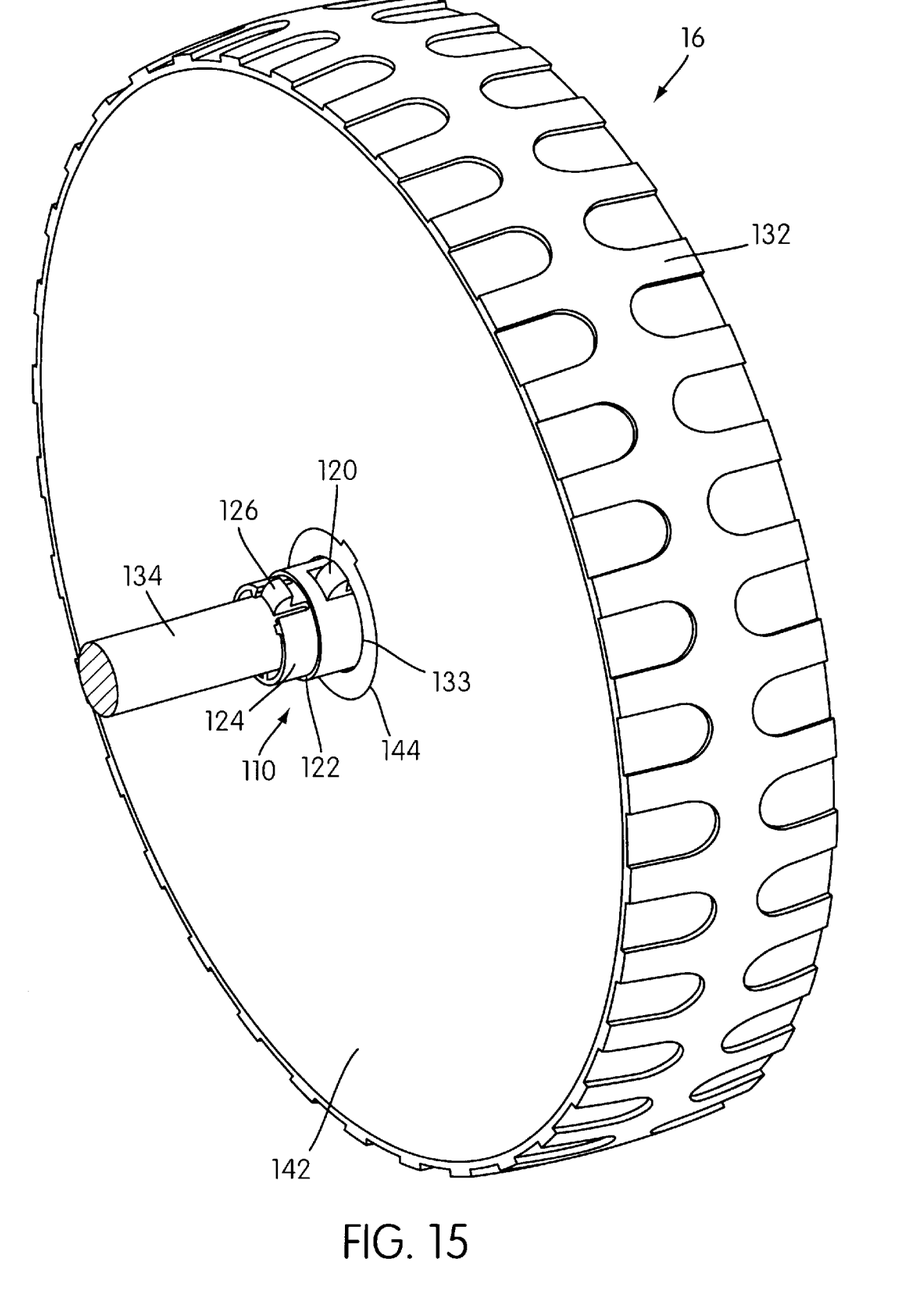
FIG. 15 is a perspective view of a wheel assembly, constructed and operative according to the teachings of the present invention, including the sleeve element of FIG. 11.

FIG. 15 shows wheel assembly 16, made up of a wheel 132 mounted on sleeve element 110 which is, in turn, mounted on an axle 134. This view illustrates how catch elements 120 retain wheel 132 against flange 118, thereby leaving secondary external surface 124 together with shoulder 122 and secondary catch elements 126 available for attachment to the wheelbarrow body.

Turning briefly to the features of wheel 132 itself, this may be any type of wheel with a central bore 133, and having suitable dimensions and structural strength for the intended application. In a preferred embodiment of the present invention, wheel 132 is formed from a structurally strong polymer material. Suitable materials include, but are not limited to, polypropylene. The wheel is typically a radially ribbed molded structure. Additional wedge-on or clip-on covers 140 (see FIG. 16) and 142 are preferably provided for attachment to the outer and inner faces of wheel 132, respectively. Inner cover 142 features a central aperture 144 to mate with the wall of the central cylindrical bore of wheel 132. Covers 140 and 142 serve both for aesthetic effect and to prevent collection of dirt around flange 118 or within wheel 132. Alternatively, other materials such as metal, metal alloys or wood may be used.

Figure 16:
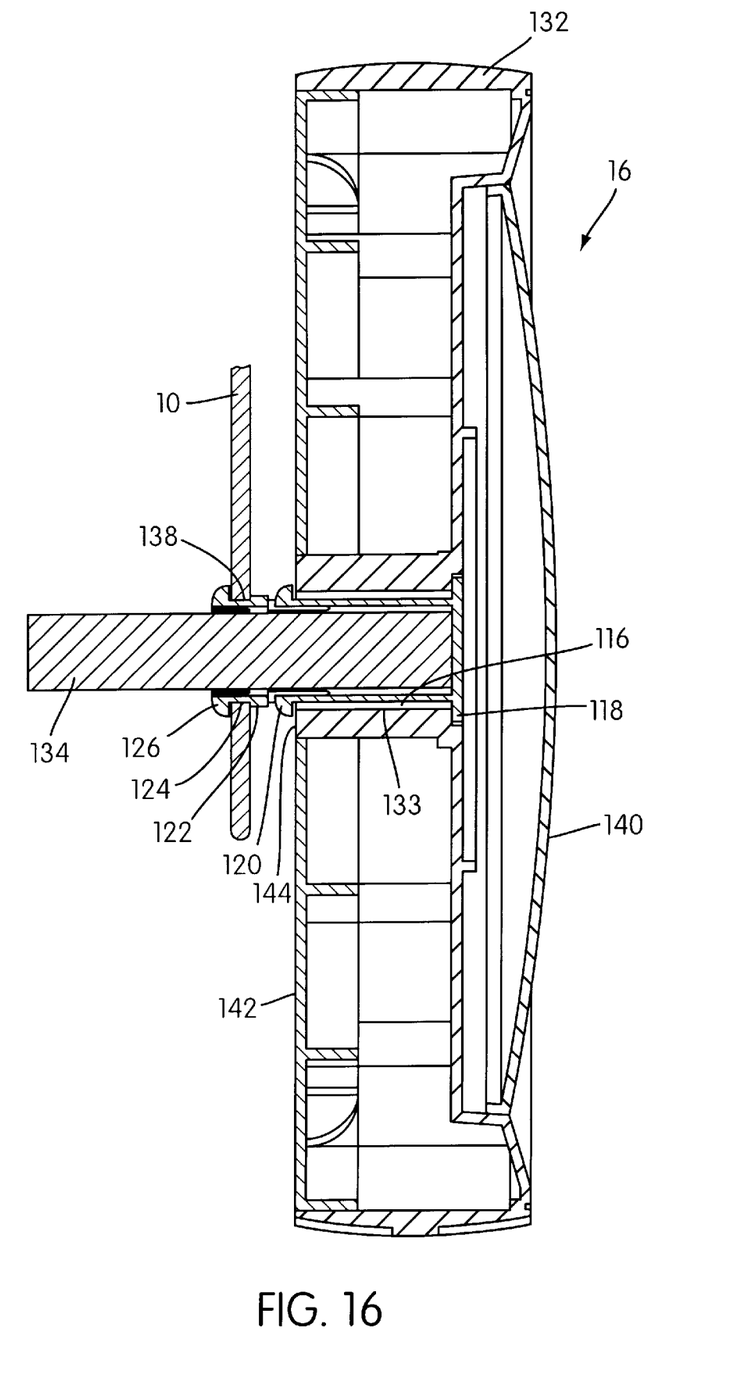
FIG. 16 is a side cross-sectional view showing the wheel assembly of FIG. 15 attached to the wheelbarrow.

FIG. 16 shows wheel assembly 130 attached to wheelbarrow 10. As can be seen here, external surface 124 is formed to fit within a circular hole 138 in wheelbarrow 10 such that sleeve element 110 acts as a bearing interposed between axle 134 and hole 138. Once inserted in this position, shoulder 122 abuts the exterior surface of wheelbarrow 10 adjacent to hole 138, and secondary catch elements 126 engage the interior surface around hole 138 such that entire wheel assembly 130 is retained rotatably engaged within hole 138.

It will be readily apparent that the assembly procedure of wheel assembly 130 is extremely simple. First, sleeve element 110 is pushed through central bore 133 of wheel 132 until resilient catch elements 120 click into position against the inner surface of wheel 132 adjacent to bore 133. Wheel 132 and sleeve element 110 are then securely attached although free to rotate relative to each other. Then, with inner cover 142 in place, wheel assembly 130 is pushed on to axle 134 until axle 134 is fully inserted within recess 114 and resilient catch elements 126 click into position against the rear surface surrounding hole 138. Finally, outer cover 140 is clipped into place. The entire assembly procedure may be performed manually in no more than a few seconds.

Once assembled, the entire wheel assembly 130 is held firmly against axial movement by the combination of shoulder 122 and resilient catch elements 126, thereby maintaining the desired spacial relationship between the wheel and the wheelbarrow body. The combination of these features with end wall 114 also serves to retain axle 134 in a defined axial position relative to the wheelbarrow body. Specifically, the use of two wheel assemblies 130 at opposite ends of an axle serves to fix the axial position of the axle completely.

Wheel assembly 130 also guarantees reliable freedom of rotation by allowing rotation of both of sleeve element 110 relative to wheelbarrow body 10, and of wheel 132 relative to sleeve element 110. The latter possibility also allows for independent rotation of wheels mounted on a common axle, thereby providing great maneuverability.

It will be appreciated that the above descriptions are intended only to serve as examples, and that many other embodiments are possible within the spirit and the scope of the present invention.

What is claimed is:

1. A wheelbarrow comprising:

a container;

a pair of angled wheelbarrow handles rigidly connected to said container, each handle having a free end;

and a support system for supporting said container, said support system including at least one wheel assembly and at least one supporting surface, wherein said container has a longitudinal-vertical plane of symmetry, the wheelbarrow having a rollable configuration in which the wheel assembly is in contact with the ground and the supporting surface is spaced from the ground, enabling the wheelbarrow to be rolled, and a self-supporting configuration, in which the wheelbarrow is supported upright by the supporting surface and the at least one wheel assembly, each of said angled wheelbarrow handles extending generally transverse to the plane of symmetry and having an extensional direction angled rearwardly and outwardly relative to the at least one wheel assembly in each of the self-supporting configuration and the rollable configuration such that, in a horizontal projection, said extensional direction forms an angle of between 65° and 85° with said plane of symmetry, said wheelbarrow being moveable from the self-supporting configuration to the rollable configuration by manually grasping and lifting the angled wheelbarrow handles upwards so that the ground-engaging surface is spaced from the ground and the wheelbarrow is supported by only the at least one wheel assembly, and wherein continued lifting of the angled wheelbarrow handles pivots the container about the at least one wheel to a container dumping configuration, the extensional direction of the angled wheelbarrow handles of between 65° and 85° facilitating manual movement of the wheelbarrow from the self-supporting configuration to the rollable configuration and then to the dumping configuration by manually grasping the angled wheelbarrow handles and lifting the angled wheelbarrow handles in a continuous motion, without releasing the grasp from the angled wheelbarrow handles.

2. The wheelbarrow of claim 1, wherein said container is divided by an intermediate wall into a front container and a rear container, said rear container being smaller than said front container.

3. The wheelbarrow of claim 2, wherein said rear container has a rear wall, said handles being integrally formed with said rear wall.

4. The wheelbarrow of claim 2, wherein said front container has side walls, said side walls having a plurality of shaped recesses, the wheelbarrow further comprising a plurality of clips configured to be received within said shaped recesses.

5. The wheelbarrow of claim 4, wherein said shaped recesses have features configured to abut edges of said clips so as to prevent said clips from swiveling.

6. A wheelbarrow of claim 1, wherein said at least one wheel assembly includes:

(a) a support region integrally formed with said container, said support region having a transverse hole;

(b) an axle passing through said transverse hole;

(c) a wheel having a central bore; and (d) a sleeve element for positioning within said central bore, said sleeve element having:

(i) an axial recess extending along a major part of the length of said sleeve element, said recess being shaped to receive said axle, (ii) an end wall for defining an extent of full insertion of said axle within said axial recess, and (iii) a substantially cylindrical external surface for rotatably engaging within said bore.

7. The wheelbarrow of claim 6, wherein said sleeve element also has:

(a) an outwardly extending radial flange for abutting an external surface of said wheel;

(b) a first resilient catch for abutting an internal surface of said wheel; and (c) a second resilient catch for engaging an edge of said transverse hole.

8. The wheelbarrow of claim 7, wherein said sleeve element also has a shoulder for abutting a surface of said support region adjacent to said transverse hole so as to space said wheel from said support region.

9. The wheelbarrow according to claim 1, wherein said handle members are integrally formed and have a central portion therebetween connected to said container and opposite unconnected distal end portions, said handle members extending outwardly and rearwardly from said central portion in cantilevered relation to said free distal end portions.

* * * * *